United States Patent
Atoro et al.

(10) Patent No.: US 8,675,005 B2
(45) Date of Patent: Mar. 18, 2014

(54) WAVEFORM OBSERVING APPARATUS AND SYSTEM THEREOF

(75) Inventors: Takashi Atoro, Osaka (JP); Naoki Goto, Osaka (JP)

(73) Assignee: Keyence Corporation, Osaka (JP)

( * ) Notice: Subject to any disclaimer, the term of this patent is extended or adjusted under 35 U.S.C. 154(b) by 461 days.

(21) Appl. No.: 12/478,234

(22) Filed: Jun. 4, 2009

(65) Prior Publication Data

US 2009/0313289 A1 Dec. 17, 2009

(30) Foreign Application Priority Data

Jun. 11, 2008 (JP) .................................. 2008-153415

(51) Int. Cl.
| | |
|---|---|
| *G06F 13/00* | (2006.01) |
| *G09G 5/22* | (2006.01) |
| *G01R 15/00* | (2006.01) |
| *G01R 19/00* | (2006.01) |
| *G06F 7/00* | (2006.01) |
| *G06F 12/00* | (2006.01) |
| *G06F 3/00* | (2006.01) |

(52) U.S. Cl.
USPC .......... 345/537; 345/536; 345/440.1; 702/57; 324/76.11; 707/646; 707/821; 707/824; 710/13; 710/33; 710/34; 710/52; 711/154

(58) Field of Classification Search
USPC ........... 345/440, 440.1, 440.2, 530, 531, 533, 345/534, 536–538; 702/66–78, 57, 80; 324/76.12, 76.11; 707/640, 644, 707/647–648, 781, 821–825, 828; 710/8, 710/13, 33, 34, 36, 48, 52, 53; 711/100, 711/154, 161, 162, 165, 167
See application file for complete search history.

(56) References Cited

U.S. PATENT DOCUMENTS

| 5,398,337 | A | * | 3/1995 | Ito ........................................ 1/1 |
| 5,832,520 | A | * | 11/1998 | Miller .................................. 1/1 |
| 2005/0101849 | A1 | * | 5/2005 | Al-Ali et al. .................. 600/323 |
| 2006/0047465 | A1 | * | 3/2006 | Ousley et al. ................. 702/127 |
| 2006/0212623 | A1 | * | 9/2006 | Honma ........................... 710/62 |
| 2009/0319731 | A1 | * | 12/2009 | Kirihata ........................ 711/155 |

FOREIGN PATENT DOCUMENTS

| JP | 07-114349 | 5/1995 |
| JP | 2000-146628 | 5/2000 |
| JP | 2002-082133 | 3/2002 |
| JP | 2002-146628 | 5/2002 |

\* cited by examiner

*Primary Examiner* — Wesner Sajous
*Assistant Examiner* — Andrew Shin
(74) *Attorney, Agent, or Firm* — Kilyk & Bowersox, P.L.L.C.

(57) ABSTRACT

There are provided a waveform observing apparatus and the system thereof in which, when a removable storage medium is inserted into the waveform observing apparatus to capture a copy of measured data, a difference copy is made while including the latest measured data collected by the waveform observing apparatus at the time, sixteenth and seventeenth measured data temporarily stored in a buffer memory are filed and stored in the state of being housed in a fourth measured data file, into a body memory. Copies of a third measured data file including part of the difference copy and a new fourth measured data file are written into the USB memory. When the USB memory is inserted into a personal computer, a hard disk of the personal computer comes into a state where its third measured data file is overwritten and stored and the fourth measured data file is newly stored.

18 Claims, 12 Drawing Sheets

WAVEFORM OBSERVING APPARATUS AND SYSTEM THEREOF

CROSS-REFERENCE TO RELATED APPLICATIONS

The present application claims foreign priority based on Japanese Patent Application No. 2008-153415, filed Jun. 11, 2008, the contents of which is incorporated herein by reference.

BACKGROUND OF THE INVENTION

1. Field of the Invention

The present invention relates to a waveform observing apparatus and the system thereof.

2. Description of the Background Art

There has been used a waveform observing apparatus for observing a temperature and pressure of equipment on a factory production line. The measured data on temperatures and pressure historically used to be written in waveform on rolled paper (chart), but with the development of electronic equipment, a waveform observing apparatus that displays a waveform by use of a display in place of paper is currently in wide use.

The waveform observing apparatus is capable of displaying in a display section a constantly varying measured value, namely a time-series waveform, while storing measured data captured from a thermocouple or the like into a memory mounted to the waveform observing apparatus. For example, Japanese Patent Application Laid-Open No. H7-114349 and Japanese Patent Application Laid-Open No. 2002-82133 each disclose a waveform observing apparatus having a display with a touch panel. Japanese Patent Application Laid-Open No. H7-114349 proposes that, by a user touching a function key displayed in a display section, a function designated by the function key displayed in the display section is executed. Japanese Patent Application Laid-Open No. 2002-82133 displays that, while a displayed waveform is observed, an operation of inputting a comment or a marking by pen-input is performed using a pen-input touch screen.

Incidentally, Japanese Patent Application Laid-Open No. 2000-146628 discloses a conventional technique in the case of writing a copy of measured data stored in a memory mounted in a waveform observing apparatus (body memory) into a removable storage medium (e.g. FD) for the purpose of long-term storage of measured data stored in the body memory. Specifically, the following technique has been disclosed as a conventional example. Namely, assuming that a storage capacity of the body memory is three hours, when measured data is stored into the body memory in every one hour, in the first one hour, measured data with a capacity for one hour is written into the FD. In the subsequent writing, measured data with a capacity for the subsequent one hour is written in addition to the data with a capacity of the last one hour. In the further subsequent writing, data with a capacity for three hours including the data with a capacity for the last two hours is written. As opposed to this, the invention proposed by Japanese Patent Application Laid-Open No. 2000-146628 proposes to make a mode selectable between a first mode of writing into the FD measured data, namely measured data with a capacity for three hours, stored in the body memory as conventionally done and a second mode of writing in the FD measured data up to the present excluding measured data having been written into the FD in the past out of measured data inside body memory, namely difference data.

Namely, Japanese Patent Application Laid-Open No. 2000-146628 proposes a technique for difference copy in which difference data as a second mode is written into an FD in regard to measured data stored in the body memory with intent to improve data writing efficiency at the time of storing measured data stored in the body memory of the waveform observing apparatus into the other storage medium for long periods. In the waveform observing apparatus currently commercially available, measured data stored in a body memory is copied into an FD or a USB memory by a method shown in FIG. 12 based upon the second mode described in Japanese Patent Application Laid-Open No 2000-146628, namely, the technique for difference copy.

With reference to FIG. 12, the waveform observing device collects measured data in accordance with a predetermined sampling cycle, and creates one measured data file in each predetermined filing creation cycle, to house measured data during filing creation cycle into the measured data file. This is specifically described as follows. When sampling of a fifth measured data is completed, a first measured data file 001 is created, and first to fifth measured data are stored into the first measured data file 001. Similarly, in a next filing creation cycle, when sampling of a tenth measured data is completed, a second measured data file 002 is created, and sixth to tenth measured data are stored into the second measured data file 002. Similarly, in a next filing creation cycle, when sampling of a fifteenth measured data is completed, a third measured data file 003 is created, and eleventh to fifteenth measured data are stored into the third measured data file 003. Further, in a next filing creation cycle, when sampling of a twentieth measured data is completed, a fourth measured data file 004 is created, and sixteenth to tenth measured data are stored into the fourth measured data file 004.

SUMMARY OF THE INVENTION

For example, in a case where some trouble occurs during collection of measured data, an external computer is used to seek for a cause of the trouble. In this case, a copy of data is acquired from the waveform observing apparatus by use of a removable storage medium, but when the conventional technique for difference copy is used, there may occur a problem in that only data stored in the body memory can be copied out of measured data collected by the waveform observing apparatus. This problem is described with reference to FIG. 12. For example, when the removable storage medium is inserted into the waveform observing apparatus at the time when the waveform observing apparatus samples the seventeenth measured data, according to the conventional difference copy, the difference copy of the measured data stored in the body memory only up to the fifteenth measured data is supplied to the removable storage medium. Namely, the difference copy is executed while excluding the subsequent sixteenth and seventeenth measured data, temporarily stored in the buffer memory, from objects of the difference copy. Accordingly, when a trouble occurs during collection of the sixteenth and seventeenth measured data after creation of the third measured data file, cause-searching by the eternal computer becomes impossible.

An object of the present invention is to provide a waveform observing apparatus and the system thereof in which, at the time of inserting a removable storage medium into the waveform observing apparatus to capture a copy of measured data therefrom, a difference copy can be made while including the latest measured data collected by the waveform observing apparatus at that time.

A further object of the present invention is to provide a waveform observing apparatus and the system thereof which facilitate management of measured data by the waveform observing apparatus and an external computer.

According to a first aspect of the present invention, the above technical problems are solved by providing a waveform observing apparatus, which temporarily stores sampled measured data, creates a measured data file in a body memory in each predetermined filing creation cycle, houses the temporarily stored measured data into the measured data file, and also supplies a removable storage medium with a copy of the measured data file stored in the body memory, wherein, in supplying the removable storage medium with a copy of the measured data file, a new measured data file is created in the body memory for housing the temporarily stored measured data.

According to a second aspect of the present invention, the above technical problems are solved by providing a waveform observing apparatus, which houses sampled measured data into a measured data file formed in a body memory in each predetermined filing creation cycle, and also supplies a removable storage medium with a copy of the measured data file stored in the body memory, the apparatus including:

a buffer memory for temporarily storing sampled measured data;

a file creating device, which creates in the body memory a measured data file for housing measured data temporarily stored in the buffer memory when the removable storage medium is inserted into the waveform observing apparatus and a difference copy command is received from the removable storage medium, and houses the buffer memory in the measured data file; and a file transferring device for supplying the removable storage medium with a copy of measured data file including difference data.

According to a third aspect of the present invention, the above technical problems are solved by providing a waveform observing apparatus which houses sampled measured data into a measured data file formed in a body memory in each predetermined filing creation cycle, and also supplies a removable storage medium with a copy of the measured data file stored in the body memory, the apparatus including:

a buffer memory for temporarily storing sampled measured data;

a file creating device, which creates in the body memory a measured data file for housing measured data temporarily stored in the buffer memory when the removable storage medium is inserted into the waveform observing apparatus and a difference copy command is received from the removable storage medium, and houses measured data of the buffer memory in the measured data file; and a file transferring device for supplying the removable storage medium with a copy of measured data file including difference data, in addition to the above waveform observing system, the above technical problems being solved by providing a waveform observing system, further including an external computer that receives a difference copy from the removable storage medium, wherein, out of the measured data files stored in the external computer, a measured data file in common with the measured data file received from the removable storage medium is overwritten and stored when the external computer receives the measured data file from the removable storage medium having completed storage of the difference copy.

According to the present invention, when measured data collected by the waveform observing apparatus is captured by use of the removable storage medium, a difference copy can be written, while including temporarily stored measured data before collected and filed by the waveform observing apparatus, from the waveform observing apparatus into the removable storage medium, with the temporarily stored measured data also being in a filed state. Therefore, at the time when the removable storage medium is inserted into the waveform observing apparatus and a copy of measured data is captured thereinto, a difference copy can be made while including the latest measured data collected by the waveform observing apparatus at that time. Further, since having been filed in the waveform observing apparatus and the external computer at the time of making a difference copy, the measured data are easily managed.

DESCRIPTION OF THE PREFERRED EMBODIMENTS

Figure 1:
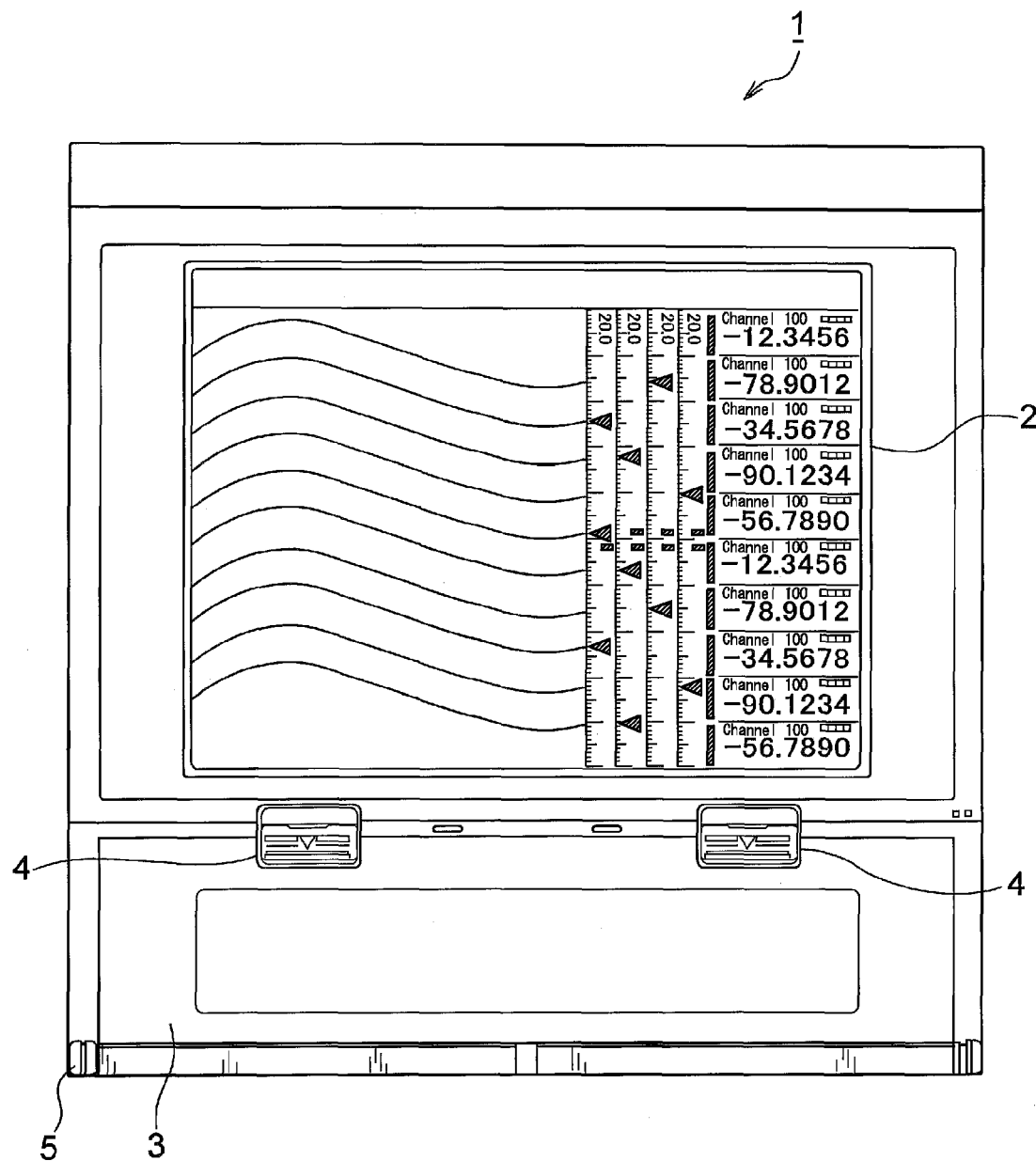
FIG. 1 is a front view of a waveform observing apparatus of an embodiment.
Figure 2:
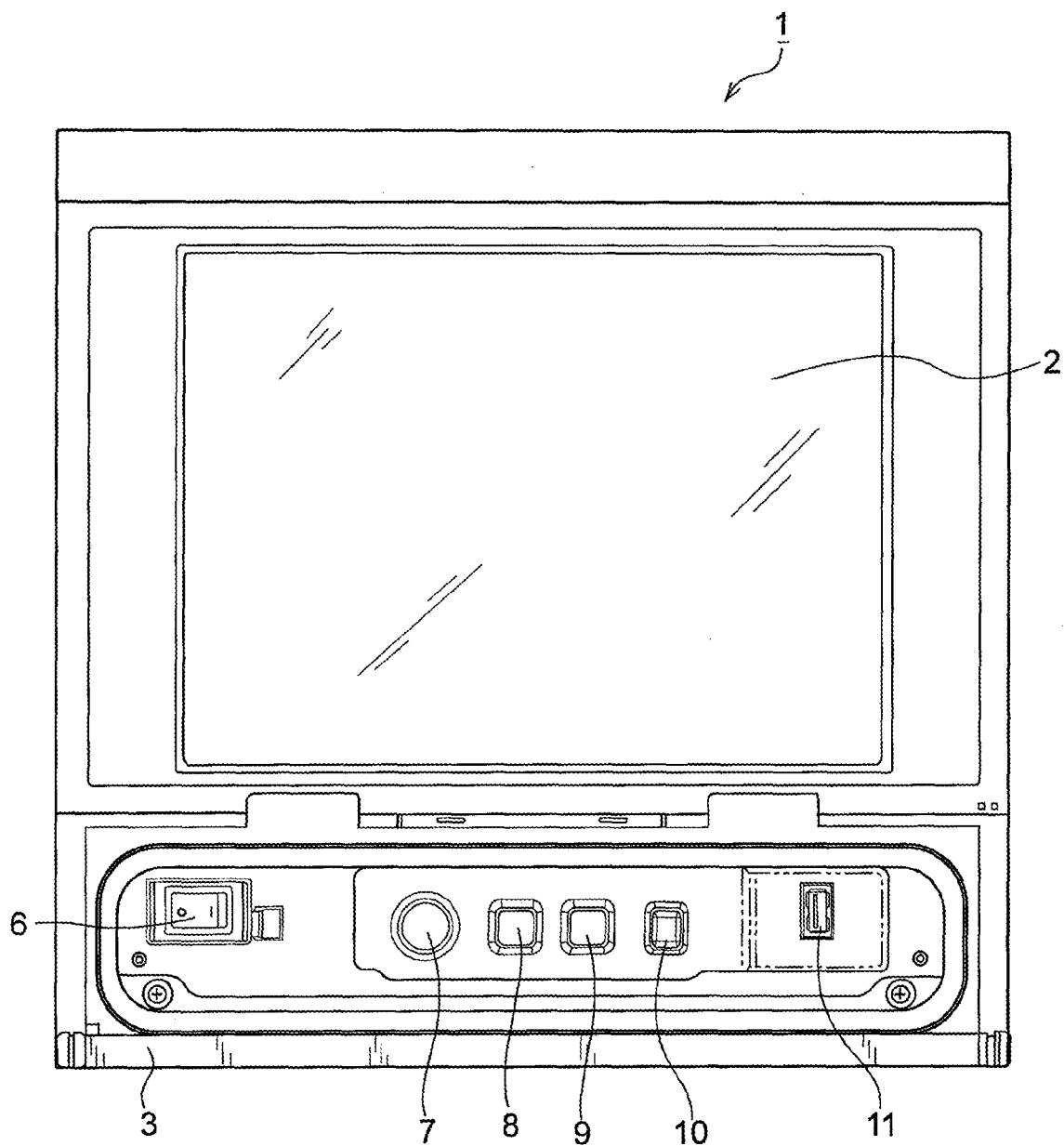
FIG. 2 is a front view of the waveform observing apparatus of the embodiment as in FIG. 1, as well as a view showing a state in which a waterproof cover provided under a display is opened.

In the following, a preferred embodiment of the present invention is described with reference to attached drawings. FIG. 1 is a front view of a waveform observing apparatus 1 of an embodiment. The waveform observing apparatus 1 has a top-open waterproof cover 3 with a lower hinge below a display section 2, and the waterproof cover 3 can be opened with a lower hinge 5 at the center by releasing a slide lock 4. FIG. 2 shows a state where the waterproof cover 3 is opened.

As seen from this FIG. 2, a main power switch 6, a start/stop switch button 7, a setting menu button 8, a user key button 9, a touch panel function lock switch button 10, and a USB connector 11 are exposed by opening the water proof cover 3.

Figure 3:
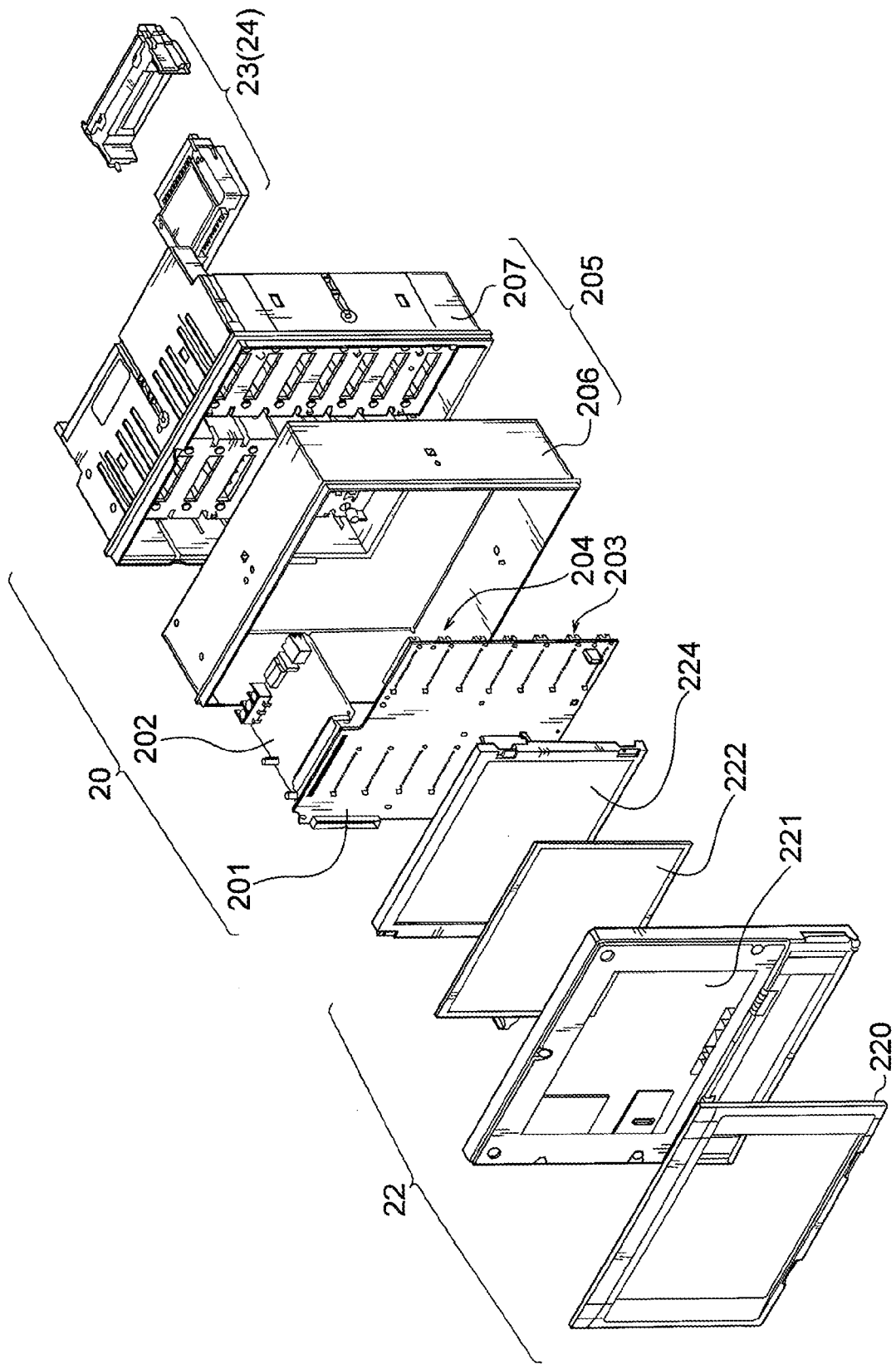
FIG. 3 is an exploded perspective view of the waveform observing apparatus of the embodiment.
Figure 4:
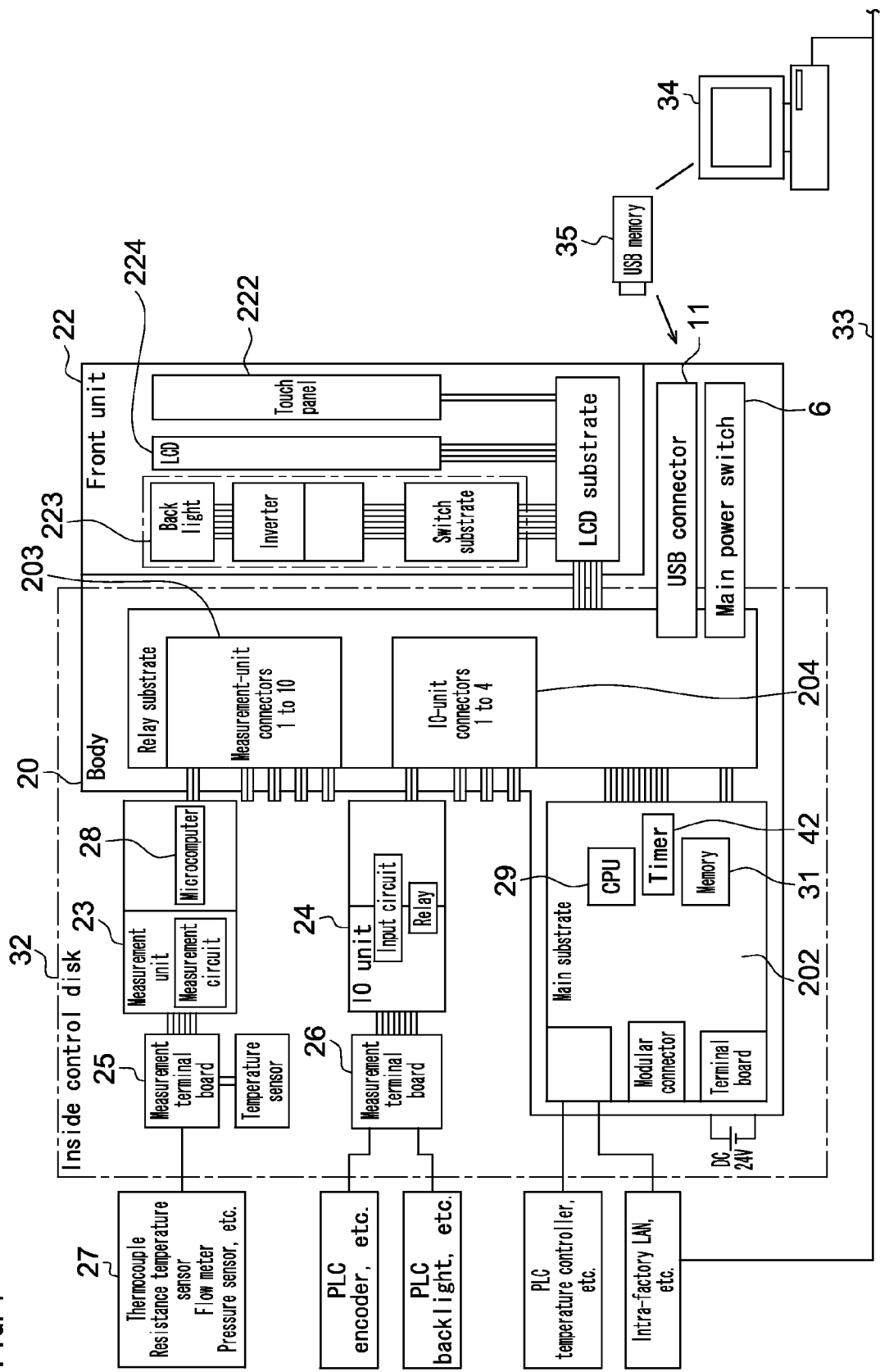
FIG. 4 is a block diagram of the waveform observing apparatus of the embodiment.

FIG. 3 is an exploded perspective view of the waveform observing apparatus 1, and FIG. 4 is a block diagram of the same. The waveform observing apparatus 1 has a body 20 and a detachable front unit 22 on the front surface of this body 20. The front unit 22 is made up of a cosmetic panel 220, a front surface frame 221, a touch panel 222, and a liquid display 224 having a back light 223 (FIG. 4). The touch panel 222 and the liquid display 224 with the back light constitute the display section 2, and a waveform chart is displayed in the display section 2 as shown in the figure.

The body 20 has a relay substrate 201 located on its front surface in an erect state, and a main substrate 202 that is connected to the upper end of the relay substrate 201 and horizontally extends. The relay substrate 201 is installed with ten measurement-unit connectors 203 and four IO-unit connectors 204. The relay substrate 201 and the main substrate 202 are housed inside a body case 205.

The body case 205 is made up of a metal-made outer case 206 and an inner plastic case 207, and in the plastic case 207, multistage shelves in two right and left columns for housing measurement units 23 and IO units 24 are formed. The measurement unit 23 and the IO unit 24 can be connector-connected by being inserted into the shelves of the plastic case 207 from its rear side. Namely, the relay substrate 201 that is located in the erect state ahead of the plastic case 207 is installed with the connectors 203, 204 in positions associated with the respective shelves of the plastic case 207, and the measurement units 23 or the IO units 24 can be connector-connected by being inserted into the respective shelves of the plastic case 207. Adopting such a configuration can reduce the size of the waveform observing apparatus 1.

The measurement unit 23 and the IO unit 24 are respectively installed with terminal boards 25, 26 on the rear surfaces thereof (FIG. 4), and the terminal board 25 of the measurement unit 23 is wire-connected with a variety of sensors 27 such as a thermocouple, a resistance temperature sensor, a flow meter and a pressure sensor. Upon receipt of a signal from the sensor 27, an intra-unit microcomputer 28 communicates with a CPU 29 of the main substrate 202 through the relay substrate 201, and transmits measured data received from the sensor 27 to the main substrate 202.

The CPU 29 of the main substrate 202 performs signal processing in accordance with a predetermined program, to store the measured data into a body memory 31 in a predetermined cycle, and also generates an image signal for controlling drawing in the display section 2. The main substrate 202 and the display section 2 are connected with each other through the relay substrate 201. When the user touches the touch panel 222, a touched position signal, or a coordinate signal, corresponding to the touch is supplied from the touch panel 222 to the CPU 29 of the main substrate 202, and the CPU 29 realizes a function meant by a key corresponding to the touched place, or generates a signal for executing scroll of a waveform on display in the display section 2 based upon the coordinate signal.

The waveform observing apparatus 1 is installed into a control box 32 (FIG. 4) at the factory and can be connected to a personal computer 34 through an intra-factory LAN 33. The personal computer 34 can display the same waveform as the waveform on display in the waveform observing apparatus 1. Further, as described later, inserting a USB memory 35 as a removable recording medium into the USB connector 11 can capture a copy of data stored in the body memory 31 of the waveform observing apparatus 1.

A trigger setting as a condition for storing measured data into the body memory 31 can be made by use of the personal computer 34. Further, the personal computer 34 is incorporated with an edit-copy condition setting program for setting conditions for executing copying and edition of data to be transmitted to the USB memory 35 or the personal computer 34, and using the personal computer 34, the user can set conditions for copying and edition of the measured data. Subsequently, in accordance with the conditions for edition and copying set by the user, desired data can be read from data stored in the body memory 31, and this extracted data can be filed, so as to be transferred to the personal computer 34 or stored into the USB memory 35 as a removable recording medium.

Figure 5:
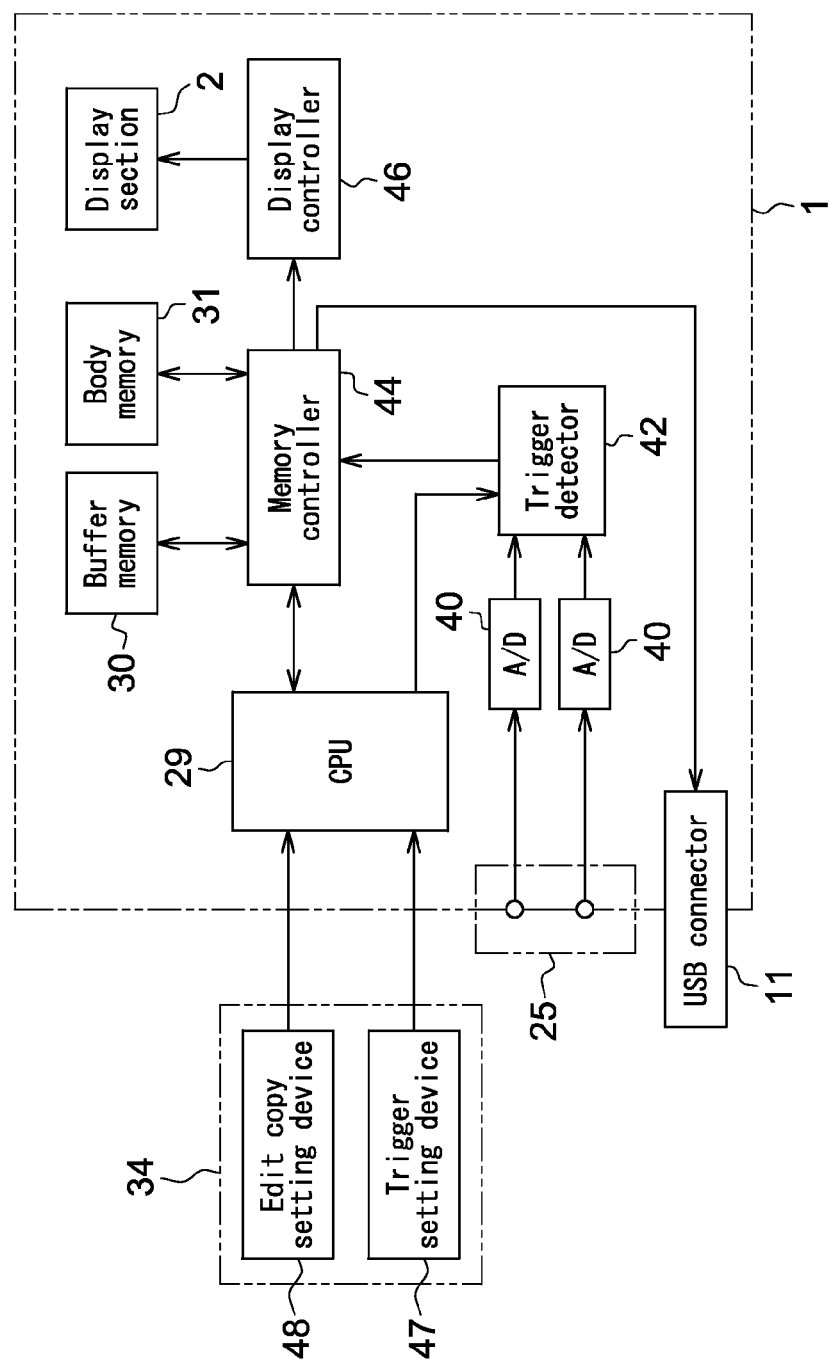
FIG. 5 is a block diagram extracting elements associated with execution of an edit-copy program for performing processing to file measured data collected by the waveform observing apparatus, store the filed data into a body memory, and filing measured data for transfer to a USB memory.

FIG. 5 is a block diagram of portions associated with input of measured data through the terminal board 25, storage of filed data into the body memory 31, and display of a waveform. A measured data signal inputted from each of the variety of sensors 27 connected to the terminal board 25 is inputted into the microcomputer 28 through an A/D converter 40 included in the measurement unit 23 (FIG. 4) and transferred from the microcomputer 28 to the CPU 29 of the main substrate 202.

In the waveform observing apparatus 1, in accordance with a trigger condition of measured data to be sampled, which was set using the personal computer 34, namely a trigger setting device 47 (FIG. 5), such as a sampling cycle for capturing measured data, a variety of events or a rise, measured data is transmitted to the memory controller 44 through a trigger detector 42 and temporarily stored into the buffer memory 30, and also transmitted to the display controller 46 through the memory controller 44, to be displayed in waveform in the display section 2. The measured data temporarily stored in the buffer memory 30 is then stored in the state of being filed in each predetermined file creation cycle, into the body memory 31.

It is to be noted that in present embodiment, a normal file is automatically created when an amount of measured data reaches a predetermined amount, namely a predetermined amount or ratio of a capacity of the buffer memory 30. However, other than such a technique, a technique may be employed in which a normal measured data file is created at the time when the number of pieces of measured data acquired reaches a previously set number or the measured data cycle reaches a previously set cycle.

The compression ratio setting device 48 is configured for setting conditions for edition and copying of data at the time of transferring a copy of part of measured data stored in the buffer memory 30 to the personal computer 34.

Conditions for edition and copying can be set using a display screen of the personal computer 34, and as items settable by the user include items as below other than a later-described difference copy.

(1) Setting of Data Extracted Range as Basic Setting:

As options, data is extracted by (1a) elapsed time; (1b) a data range; (1c) the most recent data; (1d) an alarm position; or (1e) a comment position.

(2) Setting of Detailed Conditions:

(2a) designating extraction starting date and time; (2b) designating a data position at the start of extraction; (2c) designating how many days or how many hours before the latest data in the case of extracting the most recent data; (2d) designating a time interval in the case of extracting data with predetermined time intervals; (2e) designating, by the number of pieces of data or the time, a range of data to be acquired before and after the alarm position or the comment position in the case of extracting data by each of the positions; (2f) designating, by the number of pieces of data, date, hour, and minute, a range of pre-data and/or post-data; (2g) designating a binary or a CSV as an output file format; designating (2h) whether or not to compress data; (2i) designating a compression ratio; and the like. It should be noted that the waveform observing apparatus 1 is a multi-channel, and although not shown in FIG. 6, needless to say, channels to be copied can be designated no matter those are singular or plural.

Figure 6:
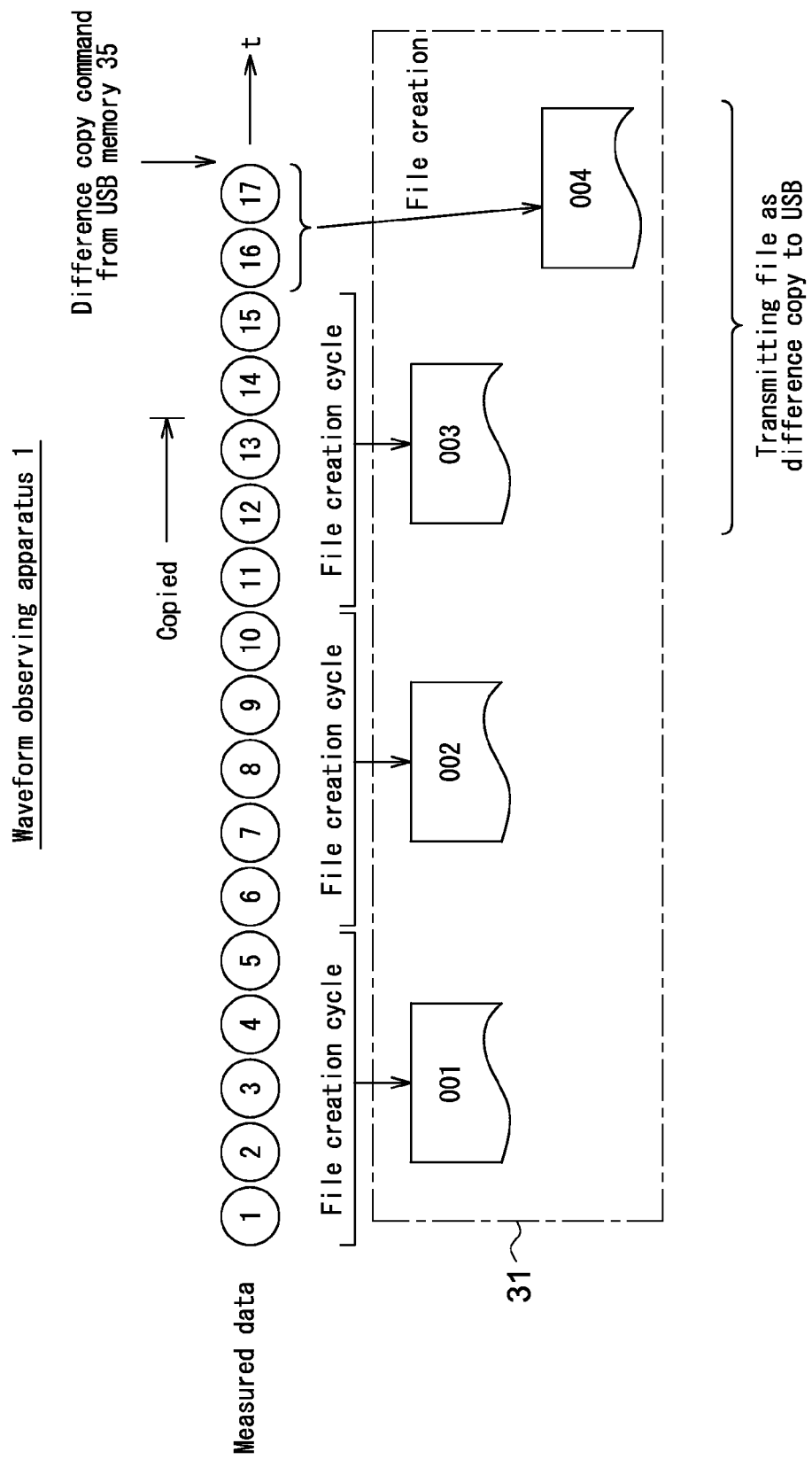
FIG. 6 is a diagram for explaining a series of processing performed by the waveform observing apparatus in regard to a difference copy.
Figure 7:
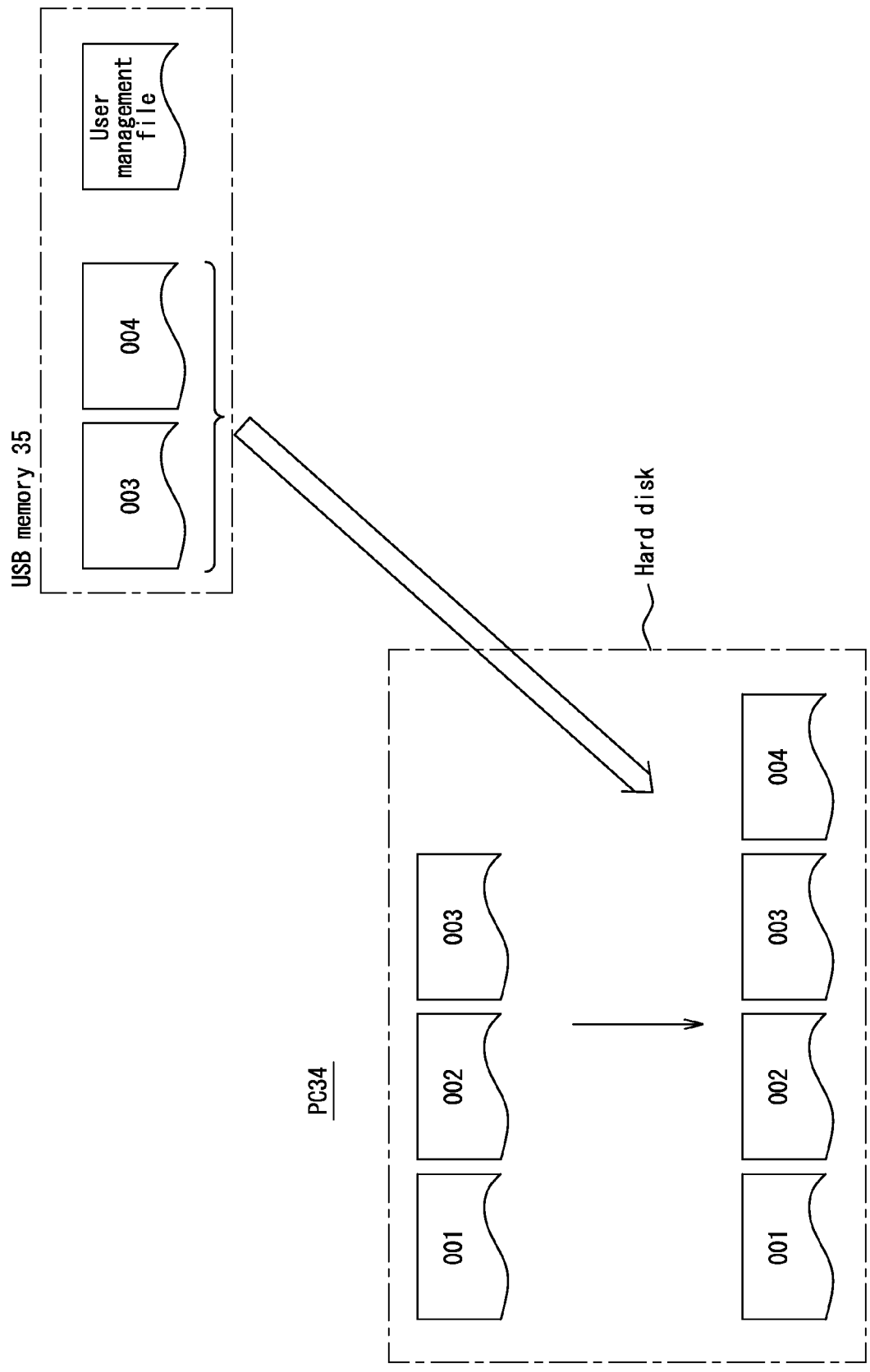
FIG. 7 is a diagram for explaining processing for supplying measured data from a USB memory to a personal computer and storing the data into the personal computer in regard to the difference copy.

FIGS. 6 and 7 are diagrams each showing a scheme of a difference copy made by use of the USB memory 35. An edit-copy program for a difference copy has been previously integrated in the waveform observing apparatus 1, and processing of FIG. 6 is executed by this edit-copy program. With reference to FIG. 6, when a command is inputted from the USB memory 35 into the waveform observing apparatus 1 at the time of sampling measured data, sixteenth and seventeenth measured data which are not yet filed are generated in the body memory 31. A File name including the serial number 004 is given to the measured data file, and also the sixteenth and seventeenth measured data which are temporarily stored in the buffer memory 30 are stored this new fourth measured data file 004.

Assuming that data up to thirteenth measured data have been previously copied, currently, a third measured data file 003 housing the thirteenth measured data houses eleventh to fifteenth measured data. In the USB memory 35 written as objects of the difference copy are copies of the third measured data file 003 and the eleventh to fifteenth measured data housed therein, and the fourth measured data file 004 that was exceptionally created before the normal file creation cycle and given the file name including the serial number, and the sixteenth and seventeenth measured data housed therein.

FIG. 7 shows measured data files stored in an internal memory of the personal computer 34. Before capturing of the third measured data file 003 and the fourth measured data file 004 from the USB memory 35, first to third measured data files 001 to 003 are stored in the personal computer 34, but the contents of the third measured data file 003 are the eleventh to thirteenth measured data. When the third measured data file 003 and the fourth measured data file 004 are transmitted from the USB memory 35 to the personal computer 34, the third measured data file 003 is overwritten. Therefore, after reception of the data from the USB memory 35, the personal computer 34 is in the state of housing the first measured data file 001 to the fourth measured data file 004. The third measured data file 003 includes the eleventh to fifteenth measured data. Meanwhile, the contents of the fourth measured data file 004 are the sixteenth and seventeenth measured data. Those contents are the same as the contents of the body memory 31 of the waveform observing apparatus 1 at the time of receiving the difference copy command from the USB memory 35.

As thus described, managing measured data in units of files can not only ensure convenience in use of measured data, but also prevent leakage of data in seeking a cause of inconvenience in use of the personal computer 34 since a difference copy including measured data temporarily stored in the buffer memory 30 at the time of executing the difference copy of measured data by use of the USB memory 35 is supplied to the personal computer 34. It goes without saying that, with the use of the difference copy, writing of data from the waveform observing apparatus 1 into the USB memory 35 and writing of the USB memory 35 into the personal computer 34 can be made efficient.

Figure 8:
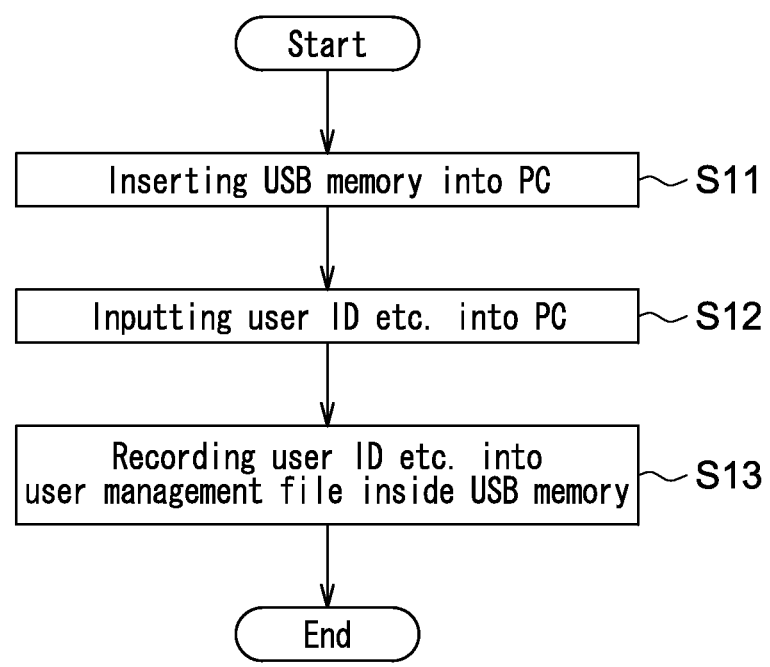
FIG. 8 is a flowchart for explaining a series of processing for initializing the USB memory to create a user management file.

A specific one example regarding the difference copy is described with reference to flowcharts of FIGS. 8 to 10. FIG. 8 shows procedures regarding initial setting of the USB memory 35. The personal computer 34 has been previously integrated with a program regarding a copy of measured data, and using this personal computer 34, initial setting of the USB memory 35 can be performed. In Step S11, the USB memory 35 is inserted into the personal computer 34, and after the data copy program of the personal computer 34 has been activated, necessary items such as a user ID and a password are inputted on an initial setting screen displayed on a monitor of the personal computer 34 (S32) so that a user management file housing the necessary items is stored into the USB memory 35 (S13).

Figure 9:
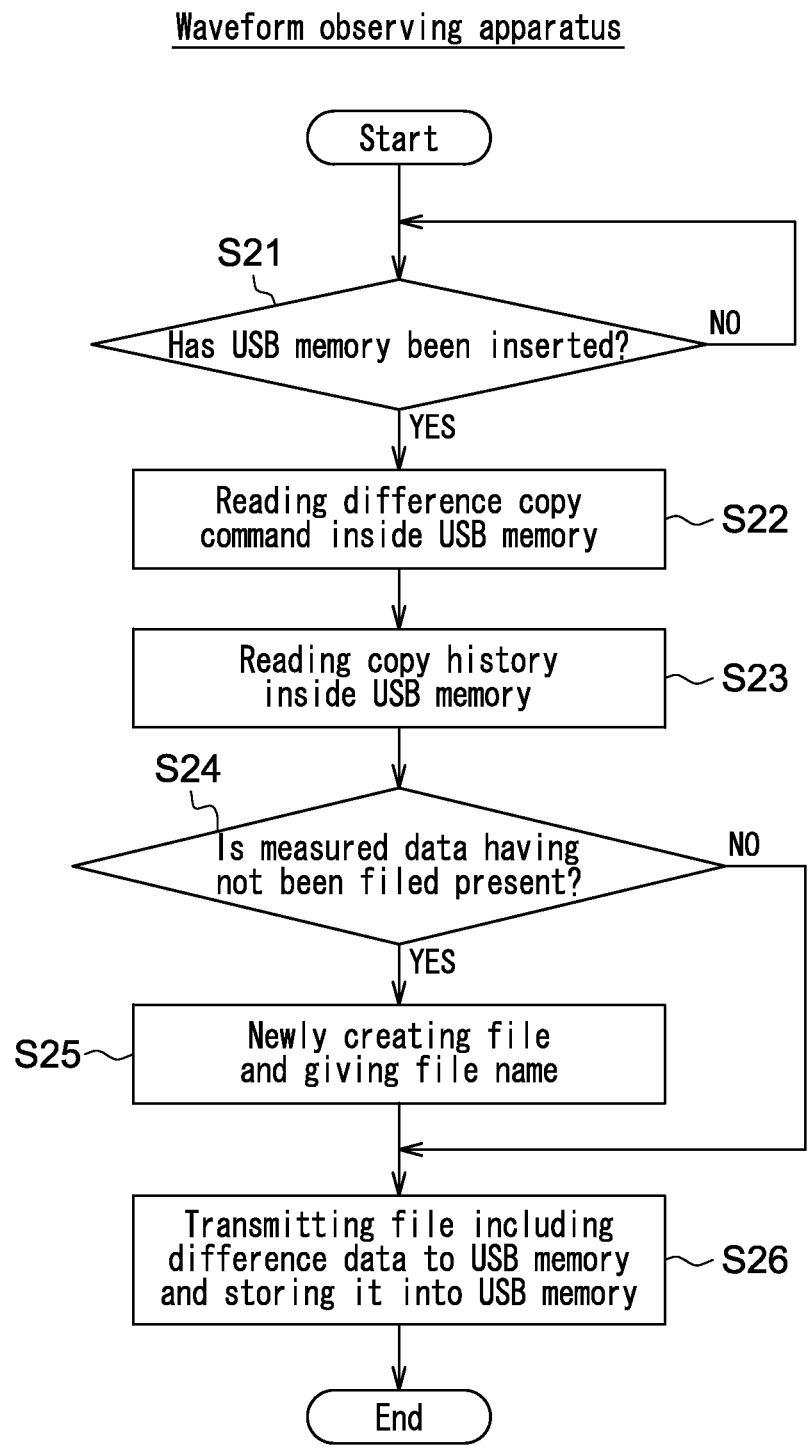
FIG. 9 is a flowchart for explaining a series of processing from insertion of the USB memory into the waveform observing apparatus to writing of the difference data into the USB memory.

FIG. 9 shows procedures for acquiring the difference copy from the waveform observing apparatus 1 by use of the USB memory 35. When the USB memory 35 is inserted into the waveform observing apparatus 1 and the user ID and the password are inputted for log-in (S21), an edit-copy program activating command and a difference copy command are transmitted from the USB memory 35 to the waveform observing apparatus 1 (S22), and thereby, the waveform observing apparatus 1 executes reading of a copy history stored in the USB memory 35 (S23). Naturally, the waveform observing apparatus 1 may store the copy history of the user.

With reference to the copy history, in the case of the example of FIG. 6, when the measured data up to the thirteenth measured data have been copied, the presence or absence of measured data having not been filed is determined, other than the existing third measured data file 003 housing measured data after the thirteenth measured data up to the fifteenth measured data (S24). When the determination is YES, namely in the case of the example of FIG. 6, when the temporarily stored sixteenth measured data, the latest seventeenth measured data are present in the buffer memory 30 at the time of receiving the copy command from the USB memory 35, in next Step S25, a new measured data file is created in the body memory 31 of the waveform observing apparatus 1, and also the file name including the serial number (004) is given to the new measured data file, and the sixteenth and seventeenth measured data are stored into this fourth measured data. Subsequently, in next Step S26, copies of the third measured data file 003 and the fourth measured data file 004 are supplied to the USB memory 35, and written into the USB memory 35.

When in above Step S24, the determination is NO, namely when temporarily stored measured data having not been filed is not present in the buffer memory 30, the process shifts to Step S26, and out of the measured data files stored in the body memory 31 of the waveform observing apparatus 1, a measured data file including measured data of the difference is supplied to the USB memory 35, and written into the USB memory 35.

Figure 11:
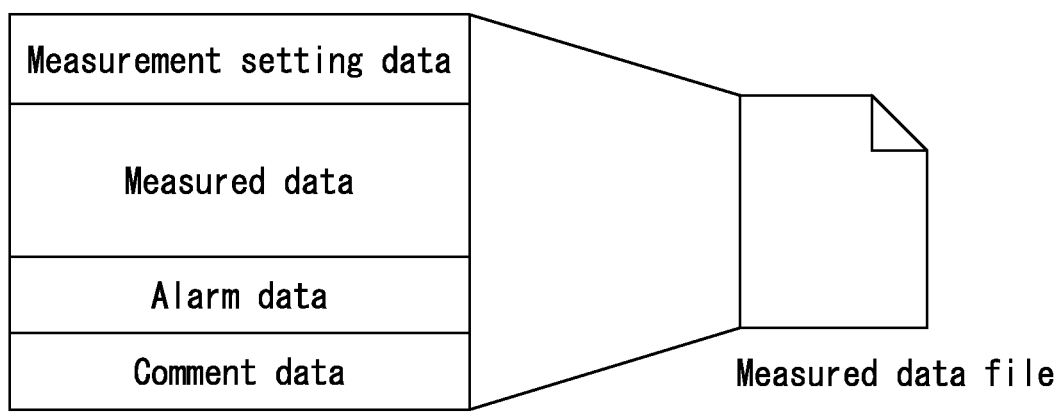
FIG. 11 is a diagram for explaining a summary of contents of a measured data file stored in a body memory of the waveform observing apparatus.
Figure 12:
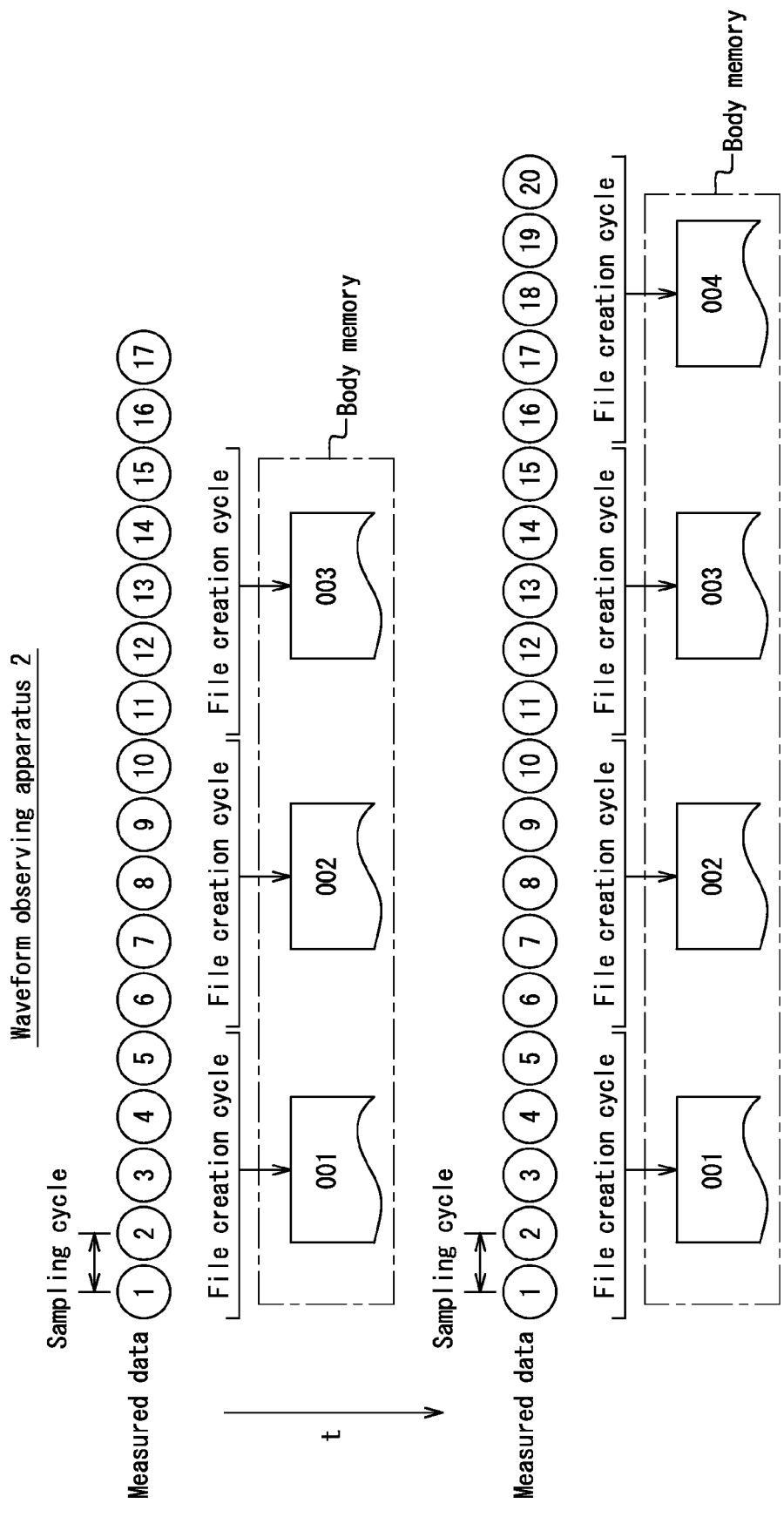
FIG. 12 is a diagram for explaining filing of measured data in a conventional waveform observing apparatus.

FIG. 11 is a diagram for explaining the contents of the measured data file. The measured data file houses: measurement setting data that was set at the time of collecting data in the waveform observing apparatus 1; an alarm that was generated during a period of collecting measured data housed in the measured data file; and comment data that was inputted by the user, and it should be understood that the difference of the above measured data includes these alarm and comment.

Figure 10:
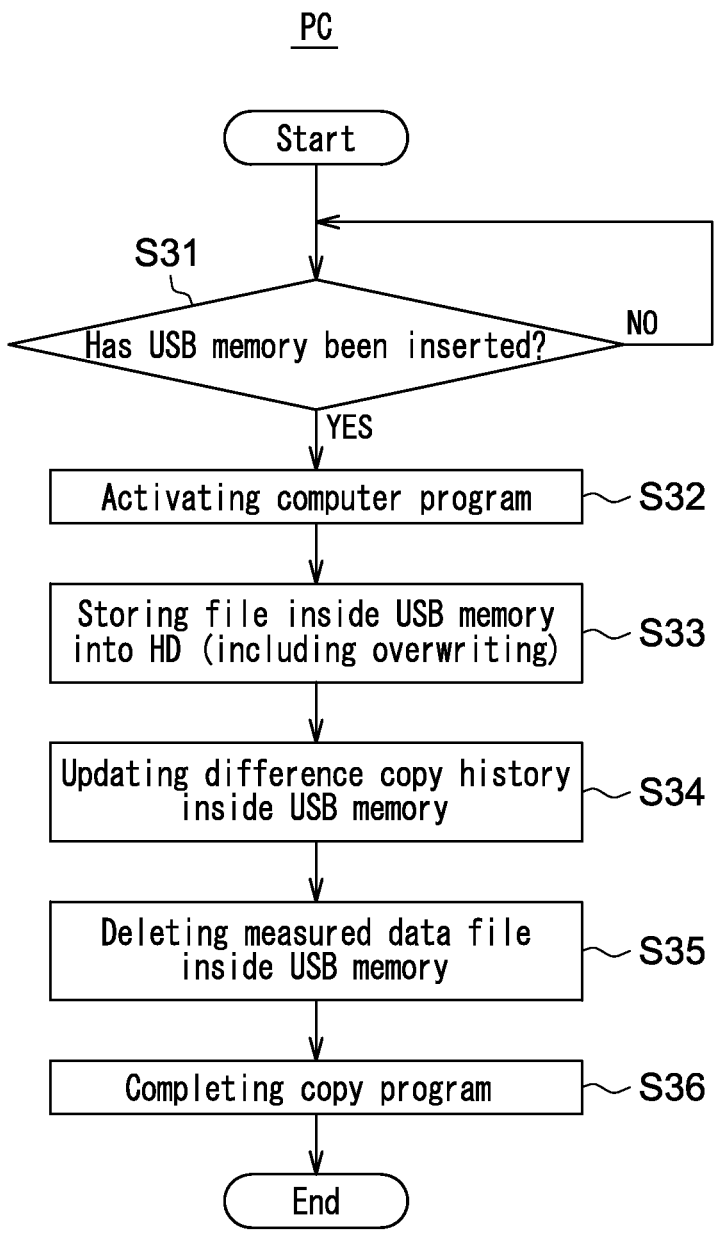
FIG. 10 is a flowchart for explaining a series of processing from insertion of the USB memory having received the difference data into the personal computer to writing of the difference data into the personal computer.

With reference to FIG. 10, procedures for transmitting data from the USB memory 35 to the personal computer 34 are described. When the USB memory 35 is inserted into the personal computer 34, the process proceeds from Step S31 to next Step S32, and a measured data copying program of the personal computer 34 is activated. By this measured data copying program, a measured data file stored in the USB memory 35 is captured, and the captured measured data file is stored into a hard disk as an internal memory of the personal computer 34 (S33).

Step S34 is described in the case of the forgoing example of FIG. 7. Before reception of the difference data from the USB memory 35, the hard disk of the personal computer 34 stores the first measured data file 001 to the third measured data file 003, and the contents of the third measured data file 003 are the eleventh to thirteenth measured data. Upon receipt of copies of the third measured data file 003 and the fourth measured data file 004 as the difference data from the USB memory 35, the third measured data file 003 is overwritten. Therefore, while the hard disk of the personal computer 34 after reception of the difference data from the USB memory 35 comes into the state of storing the first measured data file 001 to the fourth measured data file 004, the third measured data file 003 includes the eleventh to fifteenth measured data.

Upon completion of transmission of the copy of the measured data file from the personal computer 34 in Step S33, the process proceeds to Step S34, and the copy history file of the USB memory 35 is updated, to write into the USB memory 35 that the measured data up to the seventeenth measured data have been copied. Further, in Step S35, the third measured data file 003 and the fourth measured data file 004 inside the USB memory 35 are deleted. Upon completion of a series of these steps, the measured data copying program of the personal computer 34 is completed (S36).

For example in a case where a trouble occurs in the personal computer 34 and measured data collected by the waveform observing apparatus 1 is acquired by use of the USB memory 35 as the removable storage medium in order to seek for a cause of the trouble, the measured data collected by the waveform observing apparatus 1 at the time of inserting the USB memory 35 can be captured into the personal computer 34 while including the latest measured data in the buffer memory 30. It is thereby possible to accurately seek for the cause of the trouble by the personal computer 34 without an omission of data. Further, since having been filed and stored in the personal computer 34, the measured data are easily managed, which is convenient for example in searching for desired measured data.

What is claimed is:

1. A waveform observing apparatus, which temporarily stores sampled measured data, creates a measured data file in a body memory in each predetermined filing creation cycle, houses a plurality of the temporarily stored measured data into the measured data file corresponding to the each predetermined filing creation cycle, and also supplies a removable storage medium with a copy of the measured data file stored in the body memory,
wherein, in supplying the removable storage medium with a copy of the measured data file between a first predetermined filing creation cycle and a subsequent predetermined filing creation cycle, a first measured data file is created in the body memory for housing the temporarily stored measured data that exists after the first predetermined filing creation cycle, and
wherein, when said subsequent predetermined filing creation cycle occurs, a second measured data file is created in the body memory for housing the temporarily stored measured data that exists after the first predetermined filing creation cycle, including said temporarily stored measured data in said first measured data file so as to enable a user to re-write the first measured data file on the removable storage medium with said second measured data file, and wherein said first measured data is partial to the second measured data file.

2. The waveform observing apparatus according to claim 1, wherein
the waveform observing apparatus or the removable storage medium has a copy history file, and
the presence or absence of measured data to be supplied to the removable storage medium is determined based upon the copy history file.

3. A waveform observing system, further comprising an external computer that receives a difference copy from the removable storage medium, in addition to the waveform observing apparatus according to claim 1,
wherein, out of the measured data files stored in the external computer, a measured data file in common with the measured data file received from the removable storage medium is overwritten and stored when the external computer receives the measured data file from the removable storage medium having completed storage of the difference copy.

4. The waveform observing apparatus according to claim 1, wherein based upon a copy history stored in the removable storage medium and/or the wave observing apparatus, the waveform observing apparatus supplies the removable storage medium with the first measured data file along with the measured data file including different measured data from measured data previously supplied to the removable storage medium.

5. The waveform observing apparatus according to claim 1, wherein the predetermined filing creation cycle is based upon an amount of the temporarily stored measured data in the body memory.

6. The waveform observing apparatus according to claim 1, wherein the waveform observing apparatus creates the first measured data file in the body memory for housing the temporarily stored measured data when the waveform observing apparatus receives a copy command from the removable storage medium.

7. The waveform observing apparatus according to claim 1, wherein the waveform observing apparatus is configured to make a difference copy to supply a removable storage medium with a copy of the measured data file stored in the body memory.

8. The waveform observing apparatus according to claim 1, wherein the measured data is temporarily stored in a buffer memory and then stored in the state of being filed into the body memory.

9. The waveform observing apparatus according to claim 1, wherein the first measured data file is automatically created when an amount of measured data reaches a predetermined amount.

10. A waveform observing apparatus, which houses sampled measured data into a measured data file formed in a body memory in each predetermined filing creation cycle, and also supplies a removable storage medium with a copy of the measured data file stored in the body memory, the apparatus comprising:
a buffer memory for temporarily storing sampled measured data;
a file creating device, which creates in the body memory a first measured data file for housing measured data temporarily stored in the buffer memory at each predetermined filing creation cycle, and also creates in the body memory a second measured data file for housing any measured data temporarily stored in the buffer memory that is not yet stored from a predetermined filing creation cycle, when the removable storage medium is inserted into the waveform observing apparatus independent of the predetermined filing creation cycle and a difference copy command is received from the removable storage medium, and storing the second measured data file in the buffer memory; and a file transferring device for supplying the removable storage medium with a copy of the first measured data file and any said second measured data file when present, according to the difference copy command.

11. The waveform observing apparatus according to claim 10, wherein the waveform observing apparatus or the removable storage medium has a copy history file, and the presence or absence of measured data to be supplied to the removable storage medium is determined based upon the copy history file.

12. A waveform observing system, further comprising an external computer that receives a difference copy from the removable storage medium, in addition to the waveform observing apparatus according to claim 10, wherein, out of the measured data files stored in the external computer, a measured data file in common with the measured data file received from the removable storage medium is overwritten and stored when the external computer receives the measured data file from the removable storage medium having completed storage of the difference copy.

13. The waveform observing apparatus according to claim 10, wherein based upon a copy history stored in the removable storage medium and/or the wave observing apparatus, the waveform observing apparatus supplies the removable storage medium with the second measured data file along with the first measured data file including different measured data from measured data previously supplied to the removable storage medium.

14. The waveform observing apparatus according to claim 10, wherein the predetermined filing creation cycle is based upon an amount of the temporarily stored measured data in the body memory.

15. The waveform observing apparatus according to claim 10, wherein the waveform observing apparatus creates the second measured data file in the body memory for housing the temporarily stored measured data when the waveform observing apparatus receives a copy command from the removable storage medium.

16. The waveform observing apparatus according to claim 10, wherein the waveform observing apparatus is configured to make a difference copy to supply a removable storage medium with a copy of the measured data file stored in the body memory.

17. The waveform observing apparatus according to claim 10, wherein the measured data is temporarily stored in the buffer memory and then stored in the state of being filed into the body memory.

18. The waveform observing apparatus according to claim 10, wherein the first measured data file is automatically created when an amount of measured data reaches a predetermined amount.

* * * * *